US008905070B2

(12) United States Patent
Beem

(10) Patent No.: US 8,905,070 B2
(45) Date of Patent: Dec. 9, 2014

(54) STORAGE BAG AND LPG FUEL STORE

(75) Inventor: Bob Alexander Beem, Helmond (NL)

(73) Assignee: Vialle Alternative Fuel Systems B.V., Eindhoven (NL)

( * ) Notice: Subject to any disclaimer, the term of this patent is extended or adjusted under 35 U.S.C. 154(b) by 621 days.

(21) Appl. No.: 13/265,623

(22) PCT Filed: Apr. 26, 2010

(86) PCT No.: PCT/NL2010/050227
§ 371 (c)(1),
(2), (4) Date: Oct. 21, 2011

(87) PCT Pub. No.: WO2010/123366
PCT Pub. Date: Oct. 28, 2010

(65) Prior Publication Data

US 2012/0043320 A1 Feb. 23, 2012

(30) Foreign Application Priority Data

Apr. 24, 2009 (NL) ..................................... 2002792

(51) Int. Cl.
*F02M 21/00* (2006.01)
*B60K 15/077* (2006.01)
*F17C 1/16* (2006.01)
*F17C 13/04* (2006.01)

(52) U.S. Cl.
CPC . *F17C 1/16* (2013.01); *F17C 13/04* (2013.01); *F17C 2201/0133* (2013.01); *F17C 2201/0171* (2013.01); *F17C 2201/056* (2013.01);
(Continued)

(58) Field of Classification Search
CPC ................... B60K 15/03006; B60K 15/03177; F02M 37/103; F02M 37/106
USPC ........ 137/565.22, 565.34, 574, 576; 123/509; 62/50.1, 50.3, 50.6; 220/4.14, 905
See application file for complete search history.

(56) References Cited

U.S. PATENT DOCUMENTS 2,836,963 A 6/1958 Fox
4,472,946 A * 9/1984 Zwick ............................ 62/50.6
(Continued)

FOREIGN PATENT DOCUMENTS

CN 1874908 A 12/2006
DE 10 2007 004456 7/2008
(Continued)

OTHER PUBLICATIONS

International Search Report dated Jun. 24, 2010, corresponding to PCT/NL2010/050227.

(Continued)

*Primary Examiner* — John Rivell
(74) *Attorney, Agent, or Firm* — Knobbe, Martens, Olson & Bear LLP

(57) ABSTRACT

A multivalve with a storage bag and a storage bag configured for temporarily accommodating a liquid gas fuel around a discharge for a liquid gas fuel store formed from a deformable memory material, wherein the storage bag has a temporary, size-reduced position, an outer diameter of the storage bag then being less than 48 mm, and a second, operative position, the storage bag having a sufficient volume. A multivalve with a storage bag includes a storage bag having a bottom with sides rising from the bottom, a one-way valve being placed in or close to the bottom and connected to an inlet in the storage bag, the one-way valve being welded to the plastic of the storage bag.

16 Claims, 3 Drawing Sheets

(52) U.S. Cl.
CPC ... *F17C 2203/0617* (2013.01); *F17C 2203/066* (2013.01); *F17C 2203/0663* (2013.01); *F17C 2203/0685* (2013.01); *F17C 2205/0323* (2013.01); *F17C 2205/0335* (2013.01); *F17C 2205/0341* (2013.01); *F17C 2205/0382* (2013.01); *F17C 2205/0385* (2013.01); *F17C 2205/0391* (2013.01); *F17C 2209/221* (2013.01); *F17C 2221/035* (2013.01); *F17C 2223/0153* (2013.01); *F17C 2223/035* (2013.01); *F17C 2223/046* (2013.01); *F17C 2225/0153* (2013.01); *F17C 2227/0135* (2013.01); *F17C 2227/0178* (2013.01); *F17C 2250/036* (2013.01); *F17C 2250/0413* (2013.01); *F17C 2250/072* (2013.01); *F17C 2260/013* (2013.01); *F17C 2260/02* (2013.01); *F17C 2265/017* (2013.01); *F17C 2270/0168* (2013.01); *F17C 2270/0178* (2013.01)
USPC ...... 137/565.34; 137/574; 137/576; 123/509; 62/50.1

(56) References Cited

U.S. PATENT DOCUMENTS

| | | | | | |
|---|---|---|---|---|---|
| 5,038,741 | A | * | 8/1991 | Tuckey | 123/509 |
| 5,218,942 | A | * | 6/1993 | Coha et al. | 123/509 |
| 5,931,335 | A | * | 8/1999 | Cippitani | 220/724 |
| 6,050,237 | A | * | 4/2000 | Ferrera et al. | 123/276 |
| 6,152,174 | A | * | 11/2000 | Hein | 137/576 |
| 6,176,260 | B1 | * | 1/2001 | Hahner et al. | 137/574 |
| 6,192,918 | B1 | * | 2/2001 | Jaasma et al. | 137/565.34 |
| 6,305,417 | B1 | * | 10/2001 | Kleppner et al. | 137/565.34 |
| 6,904,896 | B2 | * | 6/2005 | Ricco et al. | 123/509 |
| 2002/0074362 | A1 | | 6/2002 | Py et al. | |
| 2004/0188449 | A1 | | 9/2004 | Thompson | |
| 2005/0086949 | A1 | * | 4/2005 | Noble et al. | 62/50.1 |
| 2006/0137332 | A1 | | 6/2006 | Allgeier et al. | |
| 2007/0077463 | A1 | | 4/2007 | Adams et al. | |
| 2010/0307614 | A1 | * | 12/2010 | Basaglia et al. | 137/565.11 |
| 2011/0290220 | A1 | * | 12/2011 | Cippitani | 123/509 |

FOREIGN PATENT DOCUMENTS

| | | | | |
|---|---|---|---|---|
| RU | 2057272 | C1 | | 3/1996 |
| RU | 2298724 | C2 | | 5/2007 |
| WO | WO 9703856 | A1 | * | 2/1997 |
| WO | 2008/013685 | | | 1/2008 |
| WO | WO 2008004865 | A1 | * | 1/2008 |
| WO | WO 2014027102 | A1 | * | 2/2014 |

OTHER PUBLICATIONS

Decision Grant issued in Russian Patent Application No. 2011147722 on May 16, 2014.

* cited by examiner

STORAGE BAG AND LPG FUEL STORE

The invention relates to an assembly comprising a storage bag and a fuel pump mounted therein.

It is known to temporarily accommodate a liquid fuel, such as petrol, around a discharge which is connected to a fuel system, in particular a fuel supply system of an internal combustion engine. Movements of the vehicle in which the fuel store is placed can cause liquid fuel in the fuel store to shake, as a result of which the discharge may temporarily become surrounded by gas or vapour when the tank becomes emptier. The gas or the vapour is subsequently drawn up into the fuel system and leads to sputtering of the engine. The liquid fuel can be stored temporarily in the storage bag.

LPG is a particularly liquid fuel. In a particular embodiment, use is made of an LPG fuel system which discharges the liquid part of the LPG present in the fuel store from the tank and supplies it to the internal combustion engine and wherein the use of a store of this type is beneficial for temporarily accommodating the liquid fuel.

It is known to use a rubber storage bag in LPG applications. A rubber storage bag of this type comprises a one-way valve which allows the inflow of liquid gas fuel into the bag and blocks outflow via said valve. Fuel is discharged from the bag to the fuel system.

The known LPG storage bags or bladders have the problem that the material used prevents, on the one hand, the assembly comprising the storage bag and pump from being mounted in the fuel tank through the opening intended for this purpose and, on the other hand, a sufficient buffer volume from being provided. In addition, the discharge can also comprise a filter. The bag will be mounted around the filter and pump. The assembly consisting of the storage bag and discharge is fed through an outlet in the tank, which opening is smaller than the operative outer diameter of the assembly. The outlet forms the exit for the fuel from the interior of the tank. The storage bag can easily cause damage in the opening during the mounting of the assembly.

Furthermore, it is necessary to provide an LPG store around the discharge in the store that is sufficient to compensate for any temporary lack of fuel in the environment of the discharge and the bag. The reduction in size of the diameter of the opening would also cause the temporary storage volume to decrease.

The fact that the LPG erodes the material of the storage bag can also prove problematic. A further problem is the fact that the rubber storage bag is very expensive.

A storage system for reactants to be used in fuel cells, such as hydrogen, is known from WO 2008/013685. In this document, a bladder is used for exclusively accommodating therein a fluid under comparatively high pressure, thus increasing the efficiency of the storage.

In US-A-2006/137332 a bladder is used in a reservoir for influencing the properties of the reservoir outside the bladder. This bladder is also exclusively intended for accommodating a fluid.

US 2002/074362 describes a dispenser, in particular for medication, with a bladder and a pump mounted externally of the bladder.

It is at least an object of the present invention to solve one of the foregoing problems.

According to the present invention, this object is achieved by an assembly having the properties of claim 1. This allows the storage bag to be deformed and to be brought through a 48-mm opening in the fuel tank, in particular as a component of an assembly with a fuel pump and discharge, and the storage bag, once in the tank, will adopt its normal position as a consequence of the memory material, a sufficient volume being obtained around the discharge.

Preferably, the outer diameter is greater than 48 mm in the operative position. In the operative position, the storage bag folds open, as a result of which the volume increases. A dimension of 42 mm is cited as an example of the external diameter of the fuel pump used.

Preferably, a one-way valve is placed in or close to a bottom of the storage bag and connected to an inlet in said storage bag.

The deformable memory material is preferably not a rubber. Preferably, the deformable memory material is weldable. This allows the storage bag to be formed by sealing. This is cost-effective. In one embodiment, the storage bag comprises at least one weld with which the storage bag is formed, the weld shaping the storage bag. This forms a storage bag, the weld performing three functions: the weld allows the bag to be formed, the weld forms an inexpensive connecting means and the weld has a particularly decisive effect on the operative position. The weld functions as a component of the memory material. It supplies a bias in the bag for returning the storage bag from a deformed position to the operative position.

The storage bag preferably has a bottom with sides rising from the bottom. A bag of this type is easy to manufacture.

In one embodiment, the storage bag comprises bag material and a shaping part connected thereto, the shaping part being more rigid than the bag material. By using two materials, the shaping part can supply the bias for biasing the storage bag back to the operative position after deformation.

The more rigid part can for example be connected to a bottom of the bag and then forms a bottom-forming part. Preferably, the more rigid part is configured to move parts of the storage bag away from one another, in particular sides of the storage bag. The more rigid part can comprise a spreader for outwardly biasing sides of the storage bag.

According to one aspect of the invention, at least one of the problems is solved by providing a storage bag formed from plastic, provided with a bottom and with sides rising from the bottom. Using a plastic allows the storage bag to be assembled at low cost.

Preferably, a one-way valve is placed in or close to the bottom and connected to an inlet in said storage bag. Fuel can enter the interior of the storage bag via the inlet and along the one-way valve.

The storage bag is preferably pocket-shaped and is placed with the internal portion of the pocket in the tank through the outlet of the fuel store. By means of the inlet and the one-way valve, movement of the fuel in the fuel store will cause liquid to enter the bag through the one-way valve and the level of liquid in the storage bag will be higher than the external liquid level. This combats temporary drying-up.

Preferably, the interior of the bag is openly connected to the remaining interior of the tank, i.e. there is no difference in pressure between the interior of the bag and the remaining interior of the tank.

In one embodiment, a one-way valve is welded to the plastic of the storage bag. This makes it particularly simple to place the one-way valve on the storage bag and to securely connect it thereto. This reduces the manufacturing costs, while the use of plastic as the base material for the storage bag preserves the elasticity of the storage bag and allows the storage bag to be mounted without damage in the tank around the pump-and-filter assembly through the outlet of the tank.

It is also advantageous for a valve body of the one-way valve to be formed by a lip welded to the storage bag. Connecting the lip, which is movable between an open and a closed position so that the lip forms a valve body of the one-way valve, to the storage bag by means of a weld allows the storage bag to be assembled with the one-way valve simply and inexpensively.

The connection of the lip to the storage bag is configured to obtain biasing of the lip to the closed position, the lip moving to the opened position counter to the bias in order to allow liquid into the storage bag via the inlet. If the level of liquid in the bag is lower than the level of liquid outside the bag, the lip will open and liquid will flow into the bag. The opposite flow is checked.

In one embodiment, the storage bag is provided with a bottom-forming part which is preferably welded to an inner side of the storage bag. The bottom-forming part allows the storage bag to be shaped, wherein the storage bag is opened and wherein the storage bag can accommodate a volume of fuel. In addition, the bottom-forming part allows the storage bag to be given a volume which is greater than the size of a filter of the fuel pump, for example, which can be accommodated in the storage bag. The discharge can comprise an assembly consisting of the filter and fuel pump. This allows the storage bag to surround the filter element of the discharge and prevents the filter from becoming blocked. The use of a plastic for the storage bag and the use of welded joints allows the preformed storage bag with the bottom-forming part to be obtained at low cost.

It is furthermore advantageous for the bottom-forming part to have a passage which is connected to the inlet of the storage bag, which passage is configured for passing the liquid gas fuel therethrough. This allows the rigidity of the inlet and the dimensional stability thereof to be increased, thus ensuring that liquid can reach the interior of the bag.

Preferably, a valve body of the one-way valve is welded to the bottom-forming part. In one embodiment, this valve body is placed over the passage to close off said passage. This allows the valve function to be integrated on the bottom-forming part, the placing of the bottom-forming part not only leading to the imparting of a shaped form to the storage bag, but also adding the valve function to the storage bag. This saves costs. The bottom-forming part having the valve function can be produced as a semifinished product and be connected in its entirety to the bag by means of welding.

In one embodiment, the bottom-forming part preferably has two legs protruding from a central part. This allows a bottom-forming part having a small volume to be used for shaping the storage bag, wherein the filter of the discharge can be placed on the legs, as a result of which the filter is for the most part left clear and the supply of fuel to the filter is not blocked or is hardly blocked. It is also advantageous to provide the central part with the passage. The central part is sufficiently rigid.

It is beneficial to form the storage bag from a web of plastic, the sides of the storage bag being joined together by means of a weld. The storage bag can in this way be formed simply and inexpensively.

In one embodiment, the sides surround an opening formed at their end of the storage bag and the bottom is formed at the other end of the storage bag. The discharge and the filter connected thereto can be placed through such opening. The storage bag is pocket-shaped.

It is particularly advantageous to form the storage bag from a single-layered plastic. Experiments conducted by the inventor have shown that double-layered plastic leads, in an environment of a liquid gas fuel such as LPG, to deformation and thus renders the storage bag unusable.

In one embodiment, use is made of a plastic which is 50-250 μm thick. A plastic of this type, in particular a film, is sufficiently rigid to keep the storage bag dimensionally stable and also sufficiently flexible to be placed into the tank through the outlet of said tank, together with the discharge assembly.

Preferably, the plastic is polyethylene. As a result, use is made of a raw material which is available at very low cost, allowing the costs of the storage bag to be greatly reduced. Polyethylene is also weldable.

According to another aspect, a liquid gas fuel store is provided for LPG, the gas fuel store comprising a tank having an outlet. In one embodiment, a discharge, which can be coupled to a fuel system of an engine of a vehicle, is passed through said outlet and the discharge is accommodated in a storage bag embodied in accordance with one of the foregoing features.

Preferably, the bag is made of a foldable material which, unless restrained, returns to the starting position before folding-up.

According to still a further aspect, a method is provided for forming a storage bag. The method comprises providing a plastic, in particular a plastic web, the storage bag for temporarily accommodating a liquid gas fuel around a discharge of a liquid gas fuel store being formed by welding the web to a bag, the method further comprising forming an inlet in the bag and mounting a one-way valve connected to said inlet, the one-way valve being welded to the plastic of the storage bag. A method of this type is a particularly simple method for forming a storage bag, and a storage bag is formed that has sufficient flexible properties to be passed without damage through an outlet of a tank of a gas fuel store while the storage bag is dimensionally stable enough to accommodate a temporary amount of gas fuel therein.

It is also beneficial to weld a bottom-forming part to the web. This shapes the bottom of the bag to be formed. Preferably, the bottom-forming part is welded to the web before the web is shaped to form the bag by welding the side walls. A passage is preferably provided in the bottom-forming part. Preferably, the passage is connected to an inlet formed in the bag.

According to still a further aspect, a method is provided for placing an assembly comprising of a fuel pump with a discharge in a fuel tank for LPG such as a high-pressure fuel store. A storage bag made of a deformable material is provided. The material is also a memory material. The material is formed in an operative position, the material forming a storage bag in which a sufficient volume of fuel can be accommodated. The storage bag is formed with a bottom, a one-way valve being mounted close to the bottom of the storage bag for supplying a fuel from the exterior to the interior. According to the method, the storage bag is brought into a second position, which is a temporary position of the memory material, during the introduction into the fuel opening of the fuel store, in particular a high-pressure fuel store, such as an LPG tank. According to the method, the memory material will be biased to the operative position, the bag having a sufficient volume for temporarily containing liquid gas fuel. The operative position is adopted as soon as the bag has been brought through the opening.

According to still another aspect, a multivalve is provided that is suitable to be placed in a tank opening of a high-pressure fuel tank, such as an LPG tank, the tank opening being smaller than 60 mm. The multivalve comprises a closure which can be fitted to a tank opening and is provided with one or more passages in which tank ports are accommodated. The passage contains at least one fuel discharge for discharging fuel from the tank and a fuel supply (or return) for feeding fuel back to the tank. The multivalve preferably comprises an arm, which protrudes into the interior of the tank and to which a pump can be connected, as well as a float to be accommodated in the interior of the tank. The pump can be connected to an inlet filter. The pump and inlet filter can be accommodated in a bag for temporary storage.

Preferably, the closure is provided with a screw thread for fitting to the opening.

The invention will be described in greater detail with reference to the appended drawings showing further embodiments. However, it will be clear to the person skilled in the art that a broad range of embodiments are possible within the scope of the invention. It will also be clear to the person skilled in the art that various features as mentioned in this description may be combined with another unless this is explicitly ruled out. This description includes the explicitly but also the implicitly mentioned advantages of the features specified in the present document. In the drawings.

Figure 1:
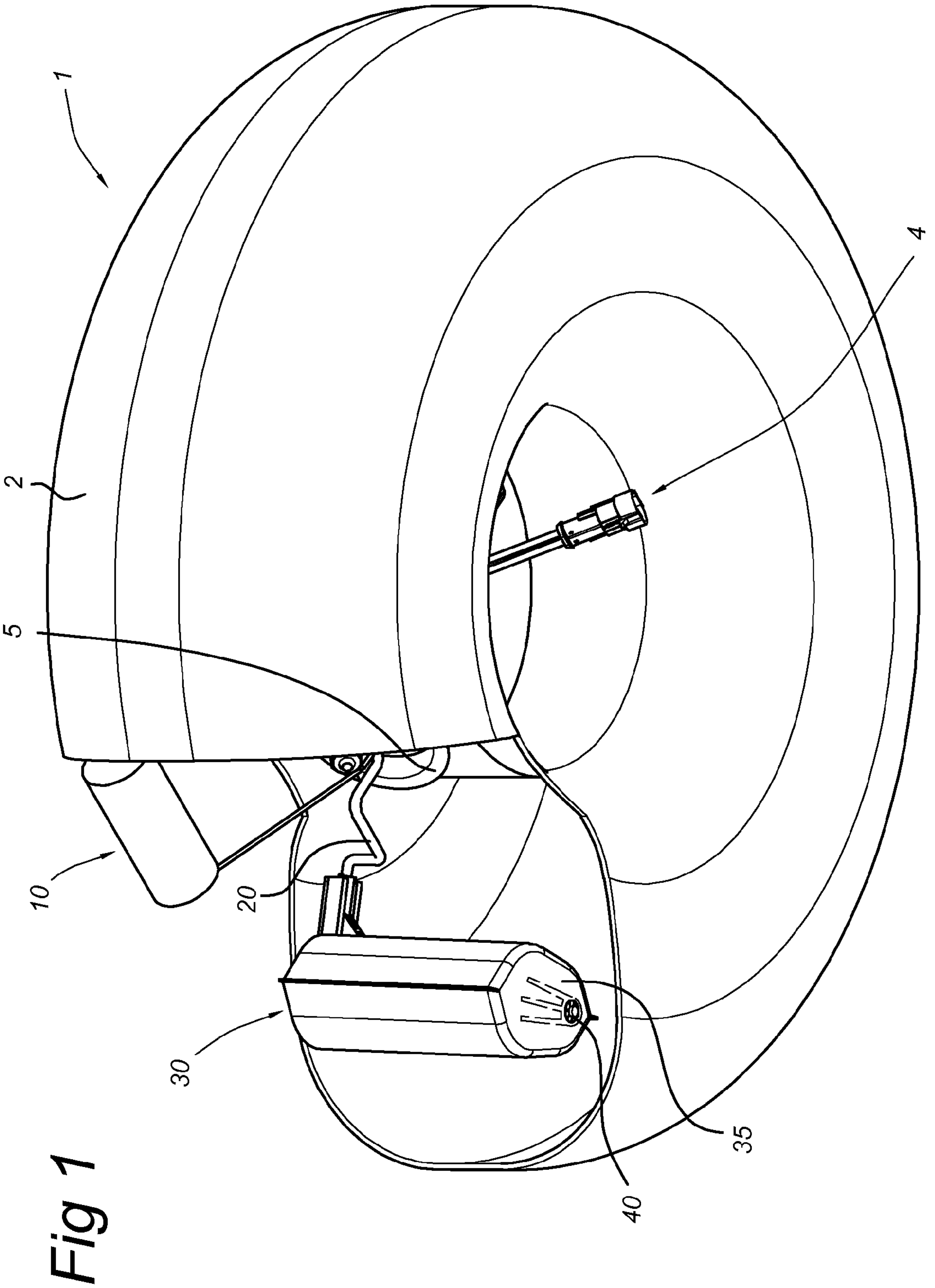
FIG. 1 is a schematic, partly exploded view of a fuel store according to a first embodiment.

FIG. 1 is a view of an LPG fuel store 1. The fuel store 1 comprises a doughnut or torus-shaped tank 2. LPG stores 1 of this type can be placed in a motor vehicle at the location of a spare tyre. The tank 2 has a fixed shape in order to be able to accommodate the LPG fuel therein under high pressure, including in particular in the liquid phase. The housing of the tank 2 is in this embodiment provided with just one opening or outlet in which a discharge element, shown in detail in FIG. 2, can be accommodated in order to discharge the fuel present in the tank and in particular to guide it to the fuel system of the vehicle in which the fuel store 1 is accommodated, in particular a motor vehicle such as a car.

A port 4 for connecting to a fuel system is shown in FIG. 1. The tank 2 is shown in partially exploded form, as a result of which a portion of the contents of the tank and in particular of the discharge element 3 can be seen inside the tank.

Figure 2:
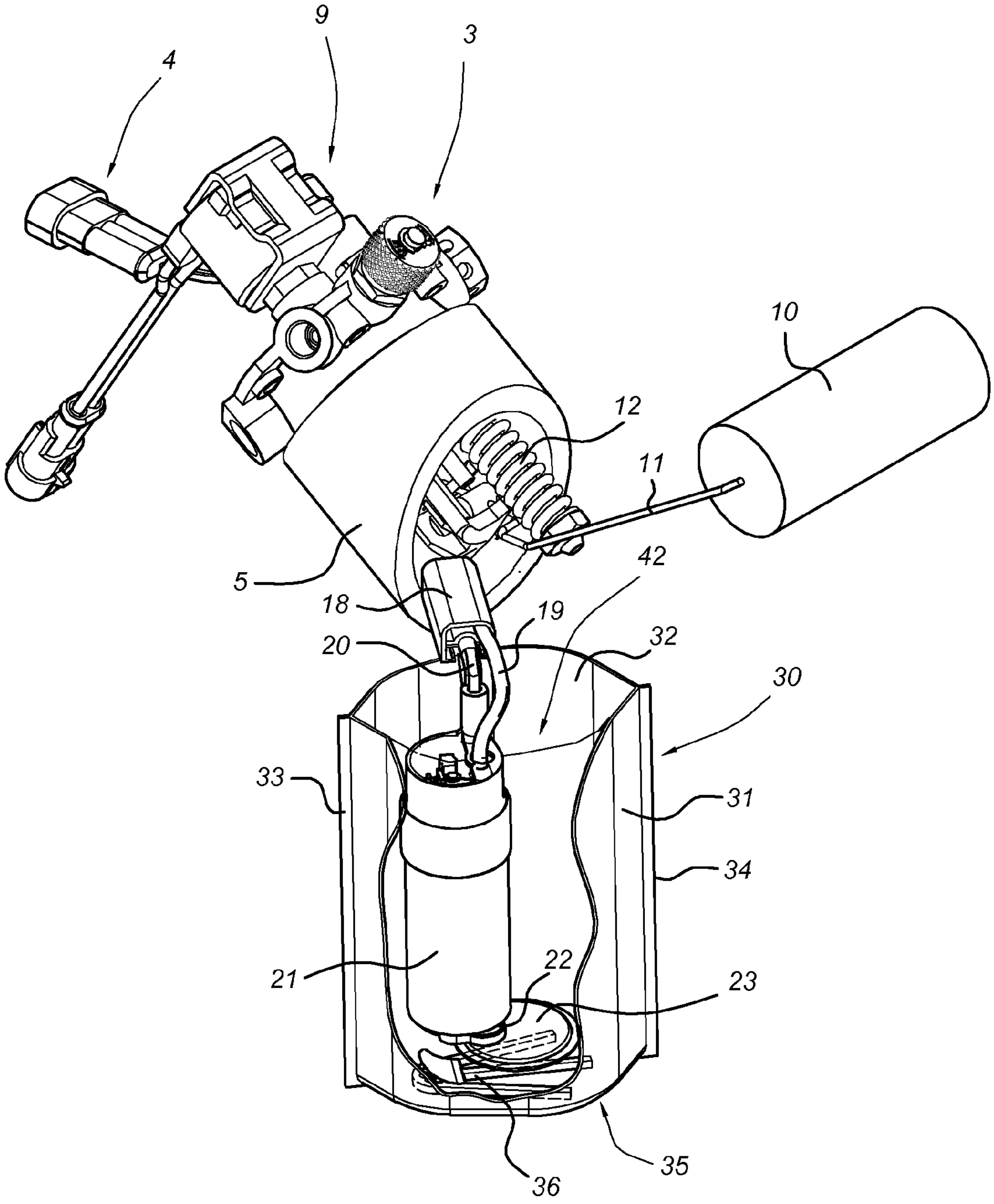
FIG. 2 is a detail-form view of a fuel discharge provided with a storage bag, which is shown in partially exploded form, according to one embodiment.

FIG. 2 shows a part of the outlet opening 5 of the housing of the tank 2 in which the discharge element 3 is accommodated. The outlet opening 5 has a diameter of about 50 mm. The pump/filter/float and storage bag 30 assembly is mounted therethrough in the interior of the tank 2.

The discharge element 3, which is embodied as what is known as a multivalve, comprises ports 9 for the fuel system, safety ports and other connections known to the person skilled in the art for connecting to the system of an internal combustion engine. The multivalve 3 can be fitted to the outlet opening, in particular by means of a screw thread connection.

At the internal side of the discharge element 3, a float 10 is provided below an arm 11 with the discharge element. Via the discharge element and a connection suitable for this purpose, the fuel system can use the float to measure the contents of the tank and is in this way able to indicate to the user when the level of fuel stored in the tank drops below a defined minimum. The spring 12 is part of the spring safety arrangement.

The discharge element 3 also comprises a rigid pump arm 20 to which a pump 21 with an input 22 is connected, to which a filter 23 is connected. A container 18, in which tubes such as a hose 19 can be accommodated, is connected to the pump arm 20. Fuel can be brought out of the fuel tank 2 into a hose 19 via the input 22 in order subsequently to be fed to the fuel system of the engine via ports 4.

The filter 23 and pump 21 are accommodated in a storage bag 30. The storage bag 30 is made of a plastic such as polyethylene and has a thickness between 100 and 300 μm, preferably 150 and 250 μm. The polyethylene is a weldable material, so that the storage bag 30 can be made from a web of polyethylene, upright side walls 31, 32 being formed, said side walls being joined together by means of a weld 33, 34. This also forms a bottom 35.

Figure 3:
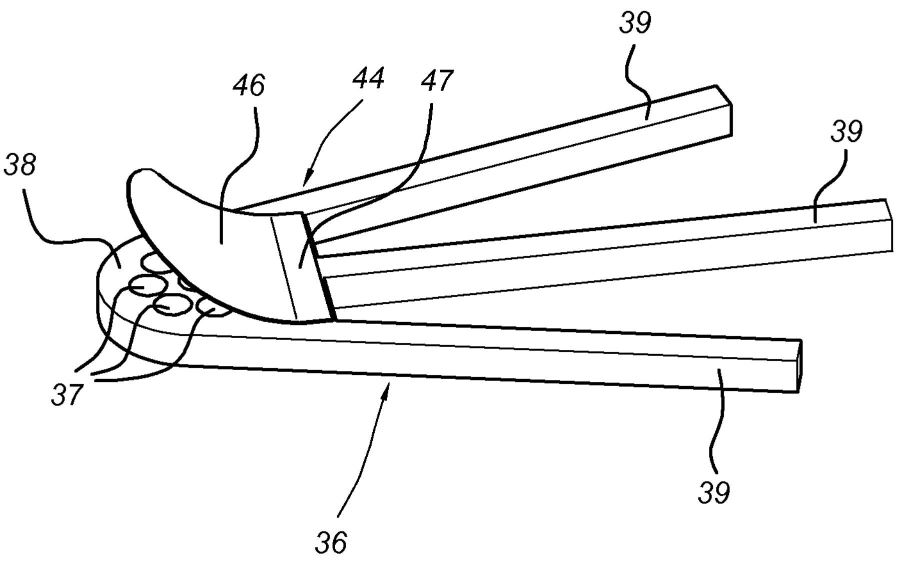
FIG. 3 is a detail-form view of a bottom-forming part according to one embodiment.

A bottom-forming part 36, which is shown in greater detail in FIG. 3, is welded to the bottom 35. The bottom-forming part 36 can also be made of a plastic and is weldable to the bottom 35 as a result. The welding of the bottom-forming part preferably takes place before the side wall welds 33, 34 are formed.

The bottom-forming part 36 comprises a passage 37, formed by a number of holes. The bottom-forming part comprises a central part 38 in which the passage 37 is formed. A number of legs 39, in FIG. 3 three legs, protrude from the central part 38. An underside of the bottom-forming part can be connected in its entirety to the bottom 35 of the storage bag 30 by means of a weld.

As shown in FIG. 2, the filter 23, which is placed upstream of the inlet 22 of the pump 21, is supported by the legs of the bottom-forming part. Here, the majority of the filter is left clear and liquid can reach the filter along the legs 39 and in this way reach the inlet of the pump.

The passage 37 formed in the central part 38 of the bottom-forming part 36 can be connected to an inlet 40 formed in the plastic of the storage bag 30. The inlet 40 is shown in FIG. 1. In the embodiment shown, the inlet 40 is formed in the bottom 35 of the storage bag 30. In another embodiment, the inlet can be formed close to a bottom of the storage bag, for example in one of the side walls.

LPG fuel present in the tank 2 can reach the interior 42 of the storage bag 30 via the inlet 40 and the passage 37 through the bottom-forming part.

FIG. 3 also shows that a lip 46, which is attached to the bottom-forming part 36 by means of a weld 47, is placed on the bottom-forming part 36, in particular on an upper side 44 thereof. The lip 46 can be biased to a closed position, the passage being closed off by means of the lip. However, the lip 46 will also be brought to the closed position as a consequence of liquid present in the store. Under the influence of the biasing, the lip 46 forms a one-way valve with the passage 37.

FIG. 3 shows the lip 46 in an opened position wherein the liquid can flow from the tank 2 into the storage bag 30 through the passage 37. The movement of the liquid fuel in the store supplies sufficient energy for initiating the transition from the closed position to the opened position as shown in FIG. 3, allowing liquid to flow into the storage bag. This allows the level of liquid in the storage bag to be in each bag at least as high as and preferably higher than the level of liquid in the storage tank. The temporary containing of the fuel around the discharge element 3, and in particular the filter 23 and input 22, is achieved as a result, thus combating drying-up of the fuel system.

The lip 46 forms the valve body of the one-way valve which allows liquid to flow into the storage bag 30, but which counteracts outflow. The lip 46 is connected to the bottom-forming part 36 by means of a weld 47 and thus connected to the storage bag 30 by means of a weld.

During manufacture, the bottom-forming part 36 can be provided with the passage 37 to which the lip 46 is subsequently welded for forming the one-way valve. The semifinished product 36 according to FIG. 3 can subsequently be welded to a web of polyethylene in order then to form the welds 33, 34 and to produce the bag.

The fact that welds are used for joining together the respective parts and thereby forming the storage bag allows the storage bag to be formed at low cost and economies to be made. Furthermore, this provides a connection which is resistant to the possible chemical reactions as a consequence of the immersion in LPG.

The assembly consisting of the pump 21 and filter 23 is brought through the opening 5 with the storage bag 30 therearound. The bag 30 assumes a compacted form, adjoining the pump body 21 and filter 23 fairly closely. The effective cross section is less small than the inner diameter of the opening 5. As a result of biasing, as a consequence of the memory material of the bag 30 and as a consequence of the biasing owing to the bottom-forming part 35, the bag 30 will fold out from a collapsed form to the operative position as shown in FIGS. 1 and 2. The welds 33, 34 assist in the adoption of the operative position. This will enable the bag 30 to accommodate a suitable amount of liquid via the valve formed by lip 46 and passage 37.

Although the figures show a valve body welded to the bag, it is possible to provide a bag having a separate valve body, for example a valve body comprising a disc, which rests against a valve seat. In one embodiment, the valve body also has a leg for guiding the opening/closing movement of the valve body away from and towards the valve seat respectively. A valve body of this type can be accommodated in or close to a bottom of the bag and will be biased, inter alia as a consequence of gravity, to a closed position if the valve body is vertically movable and the valve seat supports the valve body.

The invention claimed is:

1. Assembly comprising a storage bag (30) for temporarily accommodating a liquid gas fuel around a discharge for a liquid gas fuel store formed from a deformable memory material and a fuel pump (21) mounted in said storage bag (30),

- wherein the storage bag (30 has a bottom (35) with sides rising from the bottom,
- wherein the storage bag is formed from a plastic, a one-way valve (46, 37) being placed in or close to the bottom and connected to an inlet in the storage bag, the one-way valve (46, 37) being welded to the plastic of the storage bag,
- wherein the storage bag has a temporary, size-reduced condition, an outer diameter of the storage bag then being less than 48 mm, and a second, operative condition, the storage bag having a sufficient volume, thereby having an outer diameter of greater than 48 mm,
- wherein a bottom-forming part (36) is welded to an inner side on or close to the bottom.

2. Assembly according to claim 1, wherein the deformable memory material is weldable.

3. Assembly according to claim 1, wherein a valve body (46) of the one-way valve (46, 37) is formed by a lip (46) welded to the storage bag.

4. Assembly according to claim 1, wherein the bottom-forming part (36) has a passage (37) connected to an inlet (40) for passing the liquid gas fuel therethrough.

5. Assembly according to claim 1, wherein a valve body (46) of the one-way valve (46, 37) is welded to the bottom-forming part (36) and over a passage (35) to close off the passage (35).

6. Assembly according to claim 1, wherein the bottom-forming part (36) has at least two legs (39) protruding from a central part (38), the central part (38) being provided with a passage (37).

7. Assembly according to claim 1, wherein the storage bag is formed from a web and wherein the sides are welded to one another.

8. Assembly according to claim 1, wherein the sides (31, 32) surround an opening formed at one end of the storage bag, the bottom (35) being formed at the other end.

9. Assembly according to claim 1, wherein the storage bag is formed from a single-layered plastic.

10. Assembly according to claim 1, wherein the plastic is 150-250 μm thick.

11. Assembly according to claim 1, wherein the plastic contains PE.

12. Liquid gas fuel store comprising a tank with an outlet, wherein a discharge is passed through the outlet, the discharge being accommodated in an assembly according to claim 1.

13. Multivalve comprising a closing body (49) having a diameter of less than 50 mm to be provided to an opening of a high-pressure fuel tank, wherein the multivalve comprises one or more passages in which ports are accommodated for making connections (4) to a fuel system, the multivalve comprising an arm (20) to which a pump (21) with a filter (23) is connected, the filter being accommodated in an assembly (30) according to claim 1.

14. Assembly according to claim 1, wherein the storage bag is formed from a plastic, a one-way valve (46, 37) being placed in or close to the bottom and connected to an inlet in the storage bag, the one-way valve (46, 37) being welded to the plastic of the storage bag.

15. Assembly according to claim 1, wherein a valve body (46) of the one-way valve (46, 37) is formed by a lip (46) welded to the storage bag.

16. Assembly according to claim 1, wherein a valve body (46) of the one-way valve (46, 37) is welded to the bottom-forming part (36) and over the passage (35) to close off the passage (35).

* * * * *

UNITED STATES PATENT AND TRADEMARK OFFICE

CERTIFICATE OF CORRECTION

PATENT NO. : 8,905,070 B2
APPLICATION NO. : 13/265623
DATED : December 9, 2014
INVENTOR(S) : Bob Alexander Beem It is certified that error appears in the above-identified patent and that said Letters Patent is hereby corrected as shown below:

In the Claims

In column 7 at line 32, In Claim 1, change "(30" to --(30)--.

Signed and Sealed this
Seventh Day of July, 2015

Michelle K. Lee

Michelle K. Lee
*Director of the United States Patent and Trademark Office*